United States Patent [19]
Virtamo et al.

[11] Patent Number: 5,692,012
[45] Date of Patent: Nov. 25, 1997

[54] METHOD FOR IMAGE COMPRESSION CODING IN AN IMAGE TRANSMISSION SYSTEM

[75] Inventors: Jorma Virtamo; Seppo Valli, both of Espoo, Finland

[73] Assignee: Valtion Teknillinen Tutkimuskeskus, Espoo, Finland

[21] Appl. No.: 341,534

[22] PCT Filed: May 11, 1993

[86] PCT No.: PCT/FI93/00203

§ 371 Date: Jan. 17, 1995

§ 102(e) Date: Jan. 17, 1995

[87] PCT Pub. No.: WO93/23956

PCT Pub. Date: Nov. 25, 1993

[30] Foreign Application Priority Data

May 20, 1992 [FI] Finland ................... 922300

[51] Int. Cl.$^6$ .................................................. H04B 1/66
[52] U.S. Cl. .................... 375/240; 348/403; 348/417; 348/420; 348/422; 382/253
[58] Field of Search ........................... 375/240, 241; 348/384, 403, 417, 420, 421, 422; 358/426; 341/106; 382/232, 253

[56] References Cited

U.S. PATENT DOCUMENTS

| | | | |
|---|---|---|---|
| 5,468,069 | 11/1995 | Prasanna et al. | 382/253 |
| 5,521,988 | 5/1996 | Li et al. | 382/248 |

FOREIGN PATENT DOCUMENTS

| | | |
|---|---|---|
| 0280314 | 8/1988 | European Pat. Off. . |
| 0433268 | 6/1991 | European Pat. Off. . |
| 0450664 | 10/1991 | European Pat. Off. . |
| 0457362 | 11/1991 | European Pat. Off. . |
| 90/12460 | 10/1990 | WIPO . |

*Primary Examiner*—Stephen Chin
*Assistant Examiner*—Don Vo
*Attorney, Agent, or Firm*—Merchant, Gould, Smith, Edell, Welter & Schmidt, P.A.

[57] ABSTRACT

An image compression coding method of a digital image transmission system utilizes a known vector quantization process. In the method, at the transmitting end the block (13) to be coded is divided into quadrants (14); each quadrant is subjected to vector quantization in a sub-coder (19), utilizing a classified codebook (20), the class thereof being defined on the basis of the vector index (1) of the original block and the quadrant label (A', B', C', D') of the sub-block; the vector index (j) of the sub-block with respect to this classified codebook (20) is transmitted to the receiving end; at the receiving end, there is utilized a classified codebook which is chosen on the basis of the transmitted vector index (i) of the original block and the quadrant label (A', B', C', D') of the sub-block; at the receiving end, the chosen classified codebook, which is identical with the classified codebook at the transmitting end, the code vector index of the transmitted sub-block, so that a reconstruction is obtained for the sub-block. When designing each classified codebook, the utilized image set which receives a class index corresponding to the particular class of the codebook, when the above-described method is applied to the training image set itself.

7 Claims, 2 Drawing Sheets

METHOD FOR IMAGE COMPRESSION CODING IN AN IMAGE TRANSMISSION SYSTEM

FIELD OF THE INVENTION

The invention relates to the method defined in the introductory section of patent claim 1 for image compression coding in an image transmission system, particularly for realizing compression coding in a digital image transmission system.

BACKGROUND OF THE INVENTION

In the prior art there is known a vector quantization (VQ) method for image compression coding. The VQ method is discussed extensively in the reference publication /1/. In the VQ process, the image to be transmitted is divided into blocks, and for each block, there is searched in the codebook a codevector that best corresponds to the particular block. The vector index of this codevector, i.e. its location in the codebook, is transmitted. At the receiving end, the said vector is looked up in a corresponding codebook on the basis of the vector index of the codevector. The transmitted image is reconstructed, block by block, by means of the said codevectors. The codebook is designed beforehand by using training images and a suitable codebook design algorithm. In a corresponding fashion, the training images are divided down to the used block size while creating the codebook.

A drawback of the said VQ method is its limited block size. The efficiency of the process stems from the fact that all statistical dependencies within the block are taken into account. The correlations over the block boundaries remain unexploited. In standard vector quantization, large scale correlations can be utilized to achieve a higher compression only by using a larger block size. This unfortunately leads to an exponential growth of the codebook size for a fixed picture quality. The number of comparisons to find the best codevector in the codebook also grows respectively. Therefore VQ becomes computationally unpractical with large block sizes. Usually the block size is limited to the order of 4×4 pixels, which leaves a lot of statistical dependencies beyond the reach of the method.

The problem with large block size in vector quantization is twofold. On the one hand, the sheer size of the codebook becomes a memory storage problem. On the other hand, the computing time to find the best codevector may become excessive. Several applications of the VQ method have been developed to overcome these problems.

In a modified vector quantization process, the tree search VQ (TSVQ), the computing time problem is addressed by using a binary search procedure to find the best codevector. In image quality terms, TSVQ works slightly worse than the standard VQ.

Another modified vector quantization process, the cascaded VQ, represents a direct attack on the main problem of standard VQ, i.e. the problem with block size. In this method, a relatively large block size is chosen in order to capture the large scale correlations. However, the employed codebooks are reasonable in size and thus easily manageable. To compensate for the unavoidable lack of accuracy, the method is applied in successive coding stages. At each of the later stages, the coding error of the previous stage is quantized. A drawback is that any correlations that may exist between successive codevectors are lost.

In a third modified vector quantization process, which is a refinement of the cascaded VQ, the block size is changed when proceeding from the first coding stage to the next. The coding error, which contains the fine details of the image, is coded using sub-blocks. By using this method, the number of such codevectors in the codebook that are needed to represent the small scale details can be drastically brought down with a small block size.

In a fourth modified vector quantization process, the classified VQ, the blocks are classified prior to coding. The classification is based on local image features. This improves especially the representation of edges, which is found to be rather poor in standard VQ. For each block class there is a separate codebook. A reasonably small codebook will suffice since the image blocks in the same class have more or less similar character. Inter block correlations can be used to some extent, if the classification process is not restricted inside the block boundaries.

In a fifth modified vector quantization process, the so called finite-state VQ (FSVQ), inter-block correlations are utilized on the basis of the above mentioned classification. Thus the class of the block is defined with the aid of the larger image context. The image context includes a number of neighbouring blocks that have already been coded and transmitted. A drawback is, that classification errors may reduce the quality of the coding output of the edges represented in the image.

A sixth modified vector quantization process, the so called address VQ, utilizes the joint distribution of the vector indices of a group of blocks. Special codewords saved in a so called address codebook are reserved for the most probable combinations of vector indices. For all other combinations, the vector indices are transmitted separately. In updating the address codebook, there are utilized the detected joint probabilities of different combinations of vector indices between neighbouring blocks. The address codebook is formed as a distortionless post coding scheme on top of standard VQ, and gives the same picture quality at a lower bit rate than standard VQ.

SUMMARY OF THE INVENTION

The object of the present invention is to introduce a new method for image compression coding in an image transmission system, whereby the block size problem can be avoided at least to some extent. Another object of the invention is to achieve a new compression coding method, whereby problems connected to modified vector quantization processes can be overcome.

The method of the invention is characterized by the novel features enlisted in patent claim 1.

In the method of the invention for image compression coding in an image transmission system, particularly for carrying out image compression in a digital image transmission system, there is utilized a VQ process where the image is divided into blocks at the transmitting end, and for each block there is searched in the codebook a best corresponding codevector, and the vector index of this codevector, i.e. its location in the codebook, is transmitted to the receiving end, where the respective codevector is looked up in an identical codebook on the basis of the index, and the image is reconstructed block by block with the aid of the codevectors; the said codebook is designed beforehand by means of training images, which images are in similar fashion divided into blocks according to the employed block size. In the method of the invention at the receiving end, the block to be coded is divided into quadrants or sub-blocks;

each sub-block is subjected to vector quantization by a classified codebook, and the class thereof is defined on the basis of the vector index of the original block and the quadrant label of the sub-block;

the vector index of the sub-block, with respect to this classified codebook, is transmitted to the receiving end;

at the receiving end, there is utilized a classified codebook which is chosen on the basis of the vector index of the transmitted original block and the quadrant label of the sub-block;

at the receiving end, the codevector in question is looked up in the chosen classified codebook which is identical with the classified codebook at the transmitting end, on the basis of the vector index of the transmitted sub-block, so that a reconstruction is obtained for the sub-block; and in the method of the invention, while creating each classified codebook, the employed training image material is that part of the original training image set which belongs to the respective class, i.e. those quadrant-size sub-blocks of the training image set which receive a class index corresponding to the particular class of the codebook, when the above described method is applied to the training image set itself.

In the method of the invention, vector quantization is applied successively, starting with a suitably chosen block size and by proceeding to its quadrants. Vector quantization carried out at the latter stage utilizes information that is already coded using a larger block size by means of the so called classification. The employed defining index of a class is the vector index obtained from the first quantization, as well as the quadrant label.

In an advanced embodiment of the invention, a quadrant, i.e. a sub-block, is further divided into quadrant sub-blocks, and these further into smaller and smaller sub-blocks by following the same principle, so that each quadrant and sub-block is coded with a classified codebook, where the classifiers are the vector indices of all the parent blocks of the said quadrant or sub-block whereto the quadrant or sub-block to be coded belongs, as well as the quandrant labels of the concerned quadrant or sub-block and the said parent blocks, and where the classified codebooks are designed beforehand in the above described fashion.

In the above described method vector quantization is applied by proceeding from a suitably chosen block, i.e. block size, to its quadrants, then further down to their quadrants and so on, as far as the desired depth. At each block level, there is carried out vector quantization in which the information that was already coded in the larger block size is utilized by means of classification; the defining indices of the class are vector indices obtained as results of earlier quantizations and corresponding quadrant labels. Coding is continued down to the desired depth, as far as the bitrate of the employed transmission channel allows, or until the picture quality is otherwise sufficient. In the hierarchically classified vector quantization process of the invention, the image is thus sharpened step by step, by the aid of relatively little extra information.

In another advanced embodiment of the invention, prior to the characteristic quadrant division of the image block, the image block is reconstructed on the basis of the information coded so far, and there is formed a difference between the original image block and the reconstructed image block, which difference block thus contains the coding errors of the previously performed coding step, and the method of the invention is applied to the thus created difference block instead of the image block. The difference block is divided into quadrant blocks, which are vector quantized by utilizing the information that was already coded in larger block size by means of classification. The classified codebooks are designed, according to the method of the invention, by using as training material those sub-blocks of the difference block that obtain corresponding class indices as the considered sub-block of the difference block, when the method is applied to the training image set itself.

An advantage of the above described embodiment is that the difference signal is more compact, i.e. the values contained in the difference block fluctuate within a more limited range than the values of the image signal proper, which makes coding more efficient. However, it is pointed out that the information coded with larger block size gives a poorer description of the features of the difference block, and this decreases the advantage and coding efficiency that are characteristic of the method of the invention. The realization of an application that codes the difference signal also is somewhat more complicated.

In another advanced embodiment of the method, at the first block level the coding is made more effective by separating, prior to the coding, the mean value of the gray level values of the pixels contained in each block of the image, and by transmitting the mean value separately from the transmitting end to the receiving end.

In another advanced embodiment of the method, the image is subjected to low pass filtering at the transmitting end, and the filtered image is separately transmitted to the receiving end, and one of the above described methods or an application thereof is applied only to the high-frequency component of the image, i.e. to the difference image of the original image and the low pass filtered image. The low-frequency component contains the most important part of the image, and little information and little channel capacity are needed for its transmission. Thus the blockiness of the image is reduced, particularly in "smooth" areas, i.e. in areas containing few changes.

In another advanced embodiment of the method, the sizes of the codebooks used in coding sub-blocks and possibly subsequent smaller sub-blocks are varied case by case, on the basis of the image content of the coded block, so that in coding blocks with few details, there are used smaller codebooks than in coding blocks with a lot of details, in which case the information of the size of the codebook is transmitted as extra information.

In another advanced embodiment of the method, the sizes of the codebooks used in coding sub-blocks and possibly subsequent smaller sub-blocks are varied on the basis of the image content of the coded block, so that in coding blocks with few details, there are used smaller codebooks than in coding blocks with a lot of details, and the size of the codebook is defined permanently on the basis of the class index. In this case additional information is not transmitted, but the choice takes place automatically.

As for the advantages of the invention, let us point out the following. The method of the invention utilizes the large-scale correlations of the image. This is based on the suitably chosen large initial block size. With respect to accuracy, the process can be modified in a desired fashion, because the image is coded in several stages starting with a relatively large block, which is subsequently divided into smaller and smaller sub-blocks. The more sub-blocks are coded, the higher the accuracy of the image in the respective area becomes. Another advantage of the invention is that it is extremely efficient and the subjective quality of the coded images is good. Yet another advantage of the invention is that the method is fairly easy to apply, and low transmission rates can be achieved.

BRIEF DESCRIPTION OF THE DRAWINGS

The invention and its further advantages are explained below, with reference to the appended drawing, where.

DETAILED DESCRIPTION OF THE PREFERRED EMBODIMENT

Figure 1:
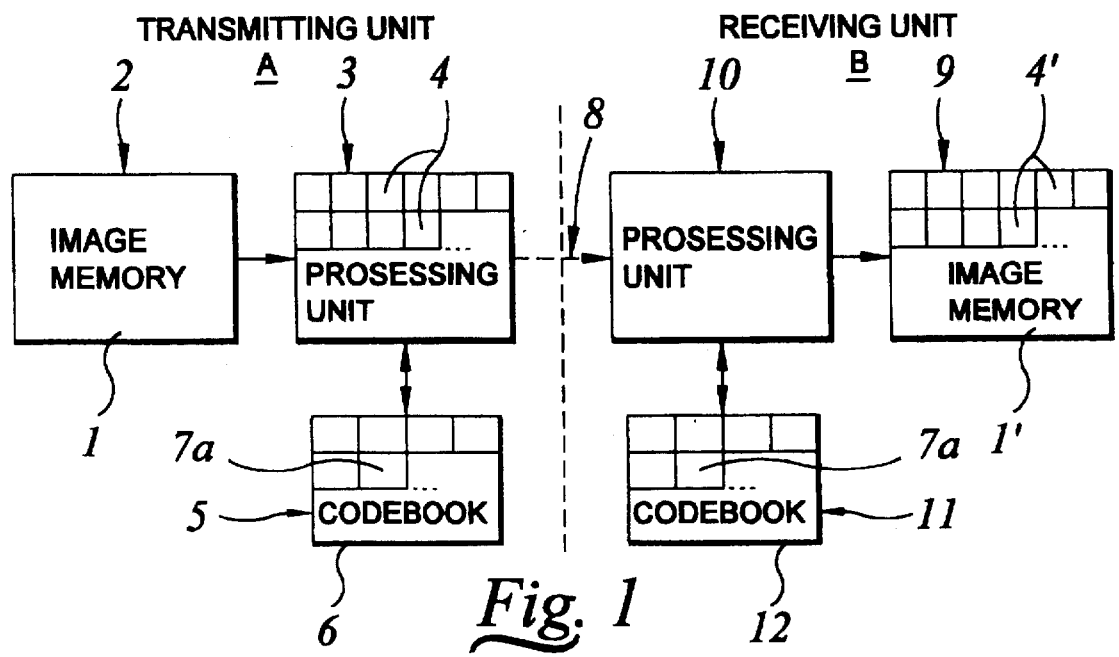
FIG. 1 is a schematical illustration of a vector coding method.

The principle of vector quantization is illustrated in the block diagram of FIG. 1. An image 1, obtained from a camera such as a video camera, is recorded in the image memory 2. The image 1 is composed of n×m pixels (n, m=integers). By means of a suitable processing unit 3, the image 1 stored in the image memory 2 is divided into blocks 4, i.e. vectors. A typical size for the block 4 is 4×4 pixels. Each pixel contains the gray tone information on a predetermined gray scale. In the processing unit 3, for each block 4 of the image there is searched the best corresponding codevector 7a from the codebook 6 stored in the codebook memory 5. The codebook 6 is designed beforehand by means of training images and by using a suitable codebook design algorithm, for instance the so called LBG algorithm /2/. The order number a of the codevector 7a in the codebook 6, i.e. its vector index, is transmitted through the transmission channel 8 from the transmitting unit A to the receiving unit B.

The image is reconstructed in the image memory 9 of the receiving unit B by looking up, by means of the image processing unit 10, the codevector 7a corresponding to the vector index a in the codebook 12 recorded in the memory 11 of the codebook. When all of the blocks 4' belonging to the image 1' are compiled in the image memory 9 as codevectors, the image can be displayed on a monitor.

Figure 2A:
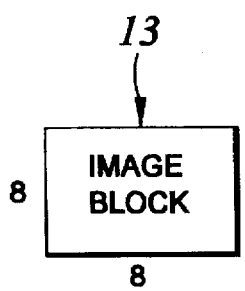
FIGS. 2a, 2b and 2c are schematical illustrations of how an image block is divided into sub-blocks in the image compression coding method of the invention.

The method of the invention for image compression coding in an image transmission system utilizes the above described vector quantization process. This is illustrated by the block diagram of FIG. 3. A larger block size than in standard VQ is chosen. Typically the size of the block 13 (cf. FIG. 2a) is for instance 8×8 pixels. At the first stage, the block is coded in the first sub-coder 16 by means of a first codebook 17 with a relatively small number of codevectors. The number of the first codevectors 18 is for instance 64. The size of the codevector 18 corresponds to the size of the block 13 and is for example 8×8 pixels. This means that at this coding stage, the image can be figured out only roughly, i.e. only the basic features contained in the low-frequency components of the image can be identified.

Figure 2B:
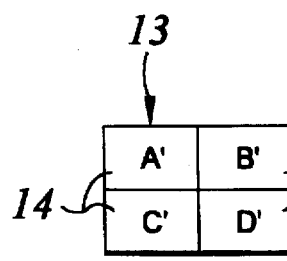

At the following stage, the blocks 13 are divided into quadrants 14, i.e. into sub-blocks 14A', 14B', 14C' and 14D', as is illustrated in FIG. 2b. Thus the size of each sub-block 14 is for instance 4×4 pixels. In the second sub-coder 19 each sub-block 14 is coded by means of the second codebook 20, which is compiled of a number of classified codebooks, by using as classifiers the vector index i of the original block 13 and the quadrant label A', B', C' and D' of the sub-block 14, i.e. its location inside the original block 13. Accordingly, in coding the sub-block 14, there is utilized, from among the classified codebooks 20, that particular codebook which is defined by the label of each quadrant 14 of the original block 13, and by the vector index i of each original block 13. The first codevector 18 found on the basis of the original block 13 defines the rough features of the image in each block thereof, and the second codevectors 21 from the second codebooks 20 sharpen the image as for the sub-blocks 14. The size of the second codevector 21 corresponds to the size of the sub-block 14 and is for instance 4×4 pixels. Thus a relatively limited amount of additional information is needed for coding the fine details, because a relatively small number of codevectors is sufficient in the classified codebook 20.

Figure 2C:
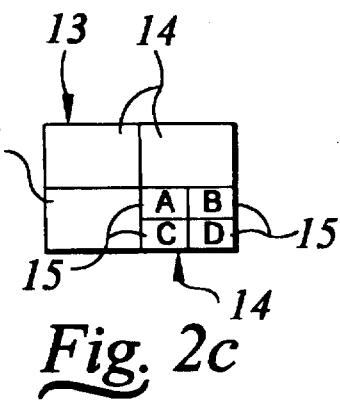

The method of the invention can be further applied by assuming at the following stage each of the sub-blocks 14A', 14B', 14C', and 14D', obtained in the above described coding process, as a new initial block and by submitting each quadrant 15A, 15B, 15C and 15D of the sub-block 14 to the same procedure (FIG. 2c). Each of these new sub-blocks 15 thus contains for instance 2×2 pixels. In the third sub-coder 22, the small sub-blocks 15 are coded by utilizing the VQ process, so that in the third codebook 23, which is composed of a number of classified codebooks, there is looked up a suitable third codevector 24. The respective vector indices i, j of the original block 13 (e.g. 8×8 pixels) and of its sub-block 14 (e.g. 4×4 pixels) whereto the new sub-blocks 15A, 15B, 15C and 15D belong, together with the quadrant labels of the sub-block 15 and the sub-block 14, define which of the said codebooks 23 is used in order to find the codevector 24. These class indices contain all the information that is so far extracted from the image content of the block. Each third codebook 23 contains a relatively small number of codevectors, and their number is generally more limited than the size of the codebooks 17, 20 used at the preceding coding level. Thus there is realized a hierarchical coding procedure, where the original relatively large image blocks can be represented step by step with growing accuracy.

Figure 4:
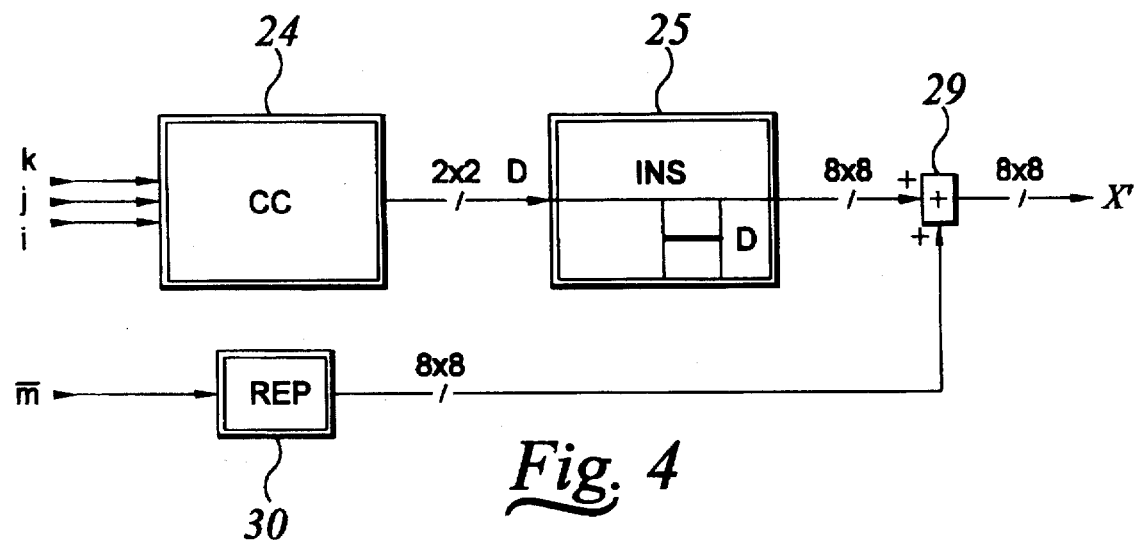
FIG. 4 respectively illustrates a decoder.

The image that is coded and further transmitted at the transmitting end, is at the receiving end decoded by a simple reversed decoding process, which is illustrated as a block diagram in FIG. 4. The combined codebook 24 of the receiving end contains codebooks that are identical with the codebooks 17, 20, 22 of the transmitting end. For the actual compilation of the image, there are used the codevectors 24 of the lowest level codebooks 23. The image is compiled block by block in the reconstruction unit 25 and is transmitted further in order to be reconstructed of blocks into an image in a previously known fashion. Each codevector 23 is completely defined by its own vector index k in the particular codebook denoted by the classifying vector index j, i. It is pointed out that only hierarchical vector indices i, j must be transmitted; the labels, i.e. location indices of the quadrants, are implied automatically by the synchronism between the coder and the decoder. The vector index which is transmitted at a certain level is shared by all its four sub-blocks and all their descendants.

Figure 3:
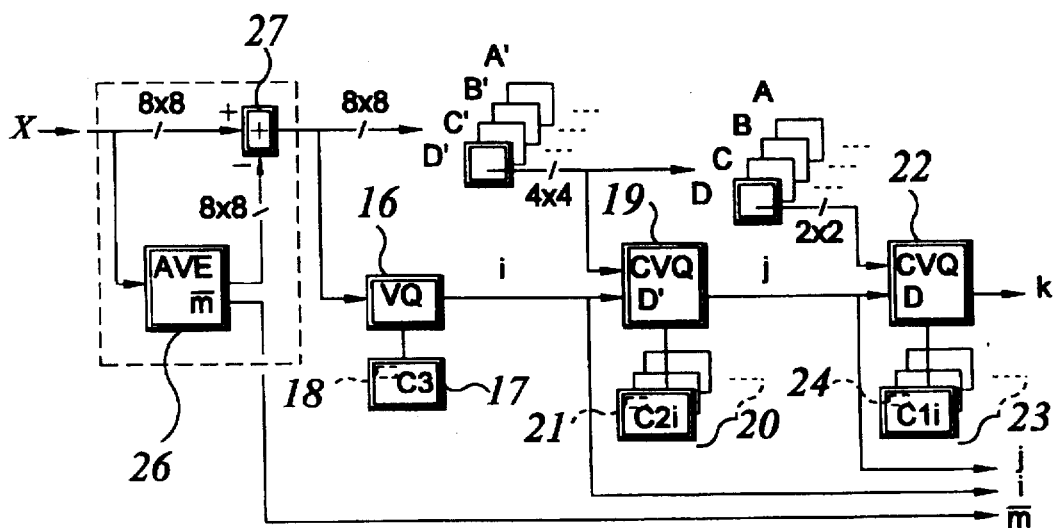
FIG. 3 is a block diagram illustrating a coder according to the compression coding method of the invention.

FIGS. 3 and 4 illustrate, in blocks marked with dotted lines, how coding and decoding is improved by means of averaging. At the transmitting end (FIG. 3), at the first block level, the mean value $\overline{m}$ of initial blocks of for instance 8×8 pixels is calculated in the averaging unit 26, and is further separated from each transmittable block in the differentiation unit 27. The mean value means the average of the gray tones in the pixels contained by each block. The mean value $\overline{m}$ is transmitted as a digital message to the transmission path and further to the receiving end. The block difference, i.e. the difference blocks, are coded and respectively decoded according to the method of the invention. At the receiving end (FIG. 4) the block according to the mean value is reconstructed in the mean value block reconstruction unit 30, and it is summed in the summing unit 29 to the difference block in decoded form.

Figure 5:
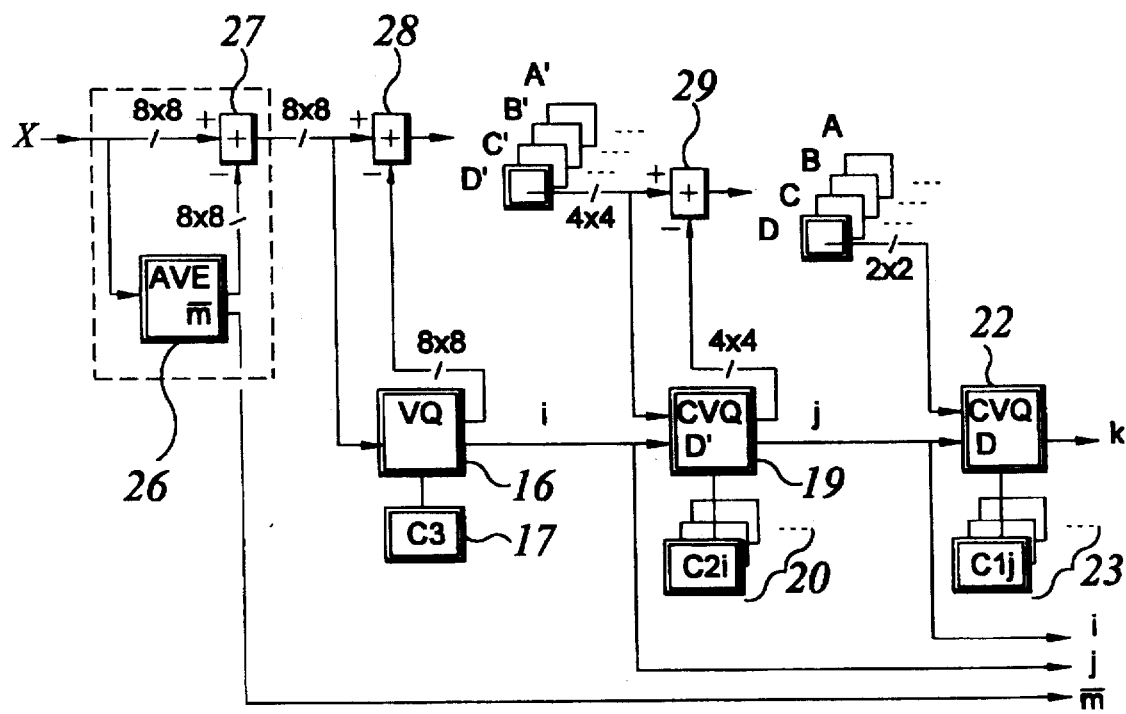
FIG. 5 illustrates another coder according to the compression coding method of the invention.

An application of the compression coding method of the invention is illustrated in FIG. 5. In this application, prior to each quadrant division of the image block, typical of the invention (cf. FIGS. 2a, 2b, 2c), the image block is first reconstructed in the sub-coder 16, 19 on the basis of the information coded so far. The difference between the image block and the reconstructed image block, i.e. the difference block, is formed in the differentiation unit 28, 29. Thus the difference block contains the coding errors of the previous coding stage. Now the method of the invention is applied to the difference block in the fashion described above, instead of the image block. In FIG. 5, like reference numbers are used of the separate units of the coder as earlier in connection with FIG. 3. At the receiving end, the decoding is in principle realized as a reversed operation with respect to the coding process.

Averaging can also be applied to the above described method of the invention, as is apparent from FIG. 5. The averaging unit 26 and the differentiation unit 27 are adjusted to the coding system prior to the coding arrangement proper of the above described process. Decoding is in principle realized in similar fashion as in the application of FIG. 4.

In standard VQ, the codebook is designed by using a large number of statistically representative training images. The generally known LBG algorithm can be used While designing the codebook. In the compression coding method of the invention the codebooks 17, 20, 23 are created by proceeding hierarchically, so that while designing each classified codebook, the employed training image material is that part of the original training image material which belongs to the class in question.

The first codebook 17 for the uppermost level is designed in the standard way by using the whole set of training blocks of the initial block size (e.g. 8×8 pixels). At the next lower level, each of the codebooks 20 is designed by using blocks of the original training images, which are first quantized with the first codebook and then grouped into different sets according to the resulting vector indices. In each set, the blocks are then divided into four quadrants (i.e. sub-blocks, such as 4×4 pixels) to form four separate subsets A', B', C', D'. All of the sub-blocks in the subset A' have the same classifying vector and quadrant indices. The obtained subsets are used as training material for the said codebooks 20.

The above described process for designing the codebooks can be continued in similar fashion, by subdividing the already created subsets of training images further into smaller subsets by classification with the codebooks already worked out and by a further division into four quadrants. Each new subset is used as a training set for a new codebook at the next lower level.

The following description offers an analytical review of the compression coding method of the invention. Let us first define that the block at the lowest level is called a basic block, and let its size be N×N pixels. The hierarchical levels of blocks are labeled by the index h. This index h runs from 1 (lowest level) to L (top level). A block at level h (h=1, .. .,L) belongs as a sub-block to a block at the next higher level, h+1. The quadrant in question is denoted by the label "$\alpha_h$, which may take any of the four values A, B, C and D (cf. FIG. 2).

The coding proceeds in a treelike manner. At level h, the whole chain of previous quantization indices and quadrant labels is: (1)

$$c_h = (i_L; \alpha_{L-1}, i_{L-1}; \ldots; \alpha_h)$$

and it forms a composite class index. The block at level h is then vector quantized using the codebook of the class $c_h$. The resulting index $i_h$ together with the class index $c_h$ defines the composite vector index: (2)

$$k_h = (i_L; \alpha_{L-1}; \ldots; \alpha_h, i_h),$$

which completely specifies the coding result at this level. This composite vector index of a sub-block, and the quadrant label of a sub-block at the next lower level again function as a classifier $C_{h-1}$ for that lower-level sub-block, and so on.

Let the size of the classified codebook at level h be $I_h$ (i.e. $i_h=1, \ldots, I_h$). Then, $b_h=\log_2 (I_h)$ bits are needed to transmit the value of the index $i_h$ from the transmitting end through the transmission path to the receiving end. As noted before, the quadrant labels are not transmitted, because they are implied by the synchronism between the coding unit of the transmitting end and the decoding unit of the receiving end. The value of index $i_h$ of a block at the level h is shared by its sub-blocks and all their descendants. Therefore, the bitrate of the whole process down to the lowest level, counted as bits per basic block (N×N pixels) is: (3)

$$R = b_1 + \frac{1}{4} b_2 + \ldots + \frac{1}{4^{L-1}} b_L = \sum_{h=1}^{L} \frac{1}{4^{h-1}} b_h.$$

Since all the values of the vector indices $i_h$ are not equally probable, the actual information transfer rate can further be reduced by entropy coding. The entropy can be calculated assuming a codeword of length: (4)

$$b_h(k_h) = -\log_2 P(i_h|c_h),$$

is associated to index $i_h$ in class $C_h$, where $P(i_h|C_h)$ gives the (conditional) probability of the vector index $i_h$ in the class. Note that at each level, the additional information needed to transmit the vector index of a block depends both on the index itself and on the class of the block, i.e. on the whole composite index $k_h$ of that block.

Let $k_h$ be the composite index of a block at the lowest level. The total amount of information for this block is then: (5)

$$R_e(k_1) = b_1(k_1) + \frac{1}{4} b_2(k_2) + \ldots + \frac{1}{4^{L-1}} b_L(k_L) = \sum_{h=1}^{L} \frac{1}{4^{h-1}} b_h(k_h),$$

where $k_h$ now means $k_h$ truncated after level h (cf. equation 2). The average total bit rate (entropy) is then: (6)

$$R_e = \sum_{k_1} P(k_1) R_e(k_1).$$

The probability distribution $P(k_1)$ of the lowest level composite vector indices $k_1$ may be estimated from their occurrence probabilities in the training set coded by the method.

The compression coding method of the invention can be understood as a special classification process inside the initial image blocks (e.g. 8×8 pixels), combined with the actual coding phase—i.e. vector quantization of sub-blocks on the lowest level (e.g. 4×4 or 2×2 sub-blocks). The compression coding method of the invention uses previous VQ results in a natural way. There is no need to find any special criterium to separate the different classes.

The compression coding method of the invention and tree search VQ (TSVQ) have similar features. In TSVQ, successive coding results (branches of the tree) determine the codebook to be used in the next stage. An essential difference in between the method of the invention and the said tree search method is, that in TSVQ the block size is fixed and remains the same through the whole process, whereas the method of the invention makes an extra branching towards smaller and smaller sub-blocks at each stage.

TSVQ mainly addresses the problem of coding time while still needing a very large codebook for good quality results, i.e. a high-quality image, with larger block sizes. An advantage of the method of the present invention is its speed, which is achieved by coding based on hierarchy levels. Another advantage is that the numbers of the codevectors of the codebooks can be maintained on a reasonable level because of the hierarchically decreasing block sizes employed to define the details of the image. Viewed from a different angle, it can be said that the compression coding method of the invention is able, for a good outcome, also to utilize large scale correlations within the picture by starting with a larger block size.

In the above specification the invention is described mainly with reference to one preferred application only, but it is naturally clear that the invention can be modified in many ways within the scope of the appended patent claims.

References:

/1/ H. Abut,ed., "Vector Quantization", IEEE Press, 1990.

/2/ Linde, A. Buzo, R. M. Gray, "An Algorithm for Vector Quantization for Image Coding", IEEE Trans Comm., vol. COM-28, pp. 2301–2304, 1991.

We claim:

1. A method for image compression coding, particularly for doing compression coding in a digital image transmission system, the method utilizing a vector quantization process comprising the steps of:

dividing the image into blocks at a transmitting end;

searching a best corresponding codevector in a codebook for each block;

transmitting a vector index that is a codevector's location in the codebook to a receiving end;

looking in an identical codebook a respective codevector on a basis of the vector index;

reconstructing the image block by block by utilizing the codevectors, the codebook being designed beforehand by means of training images, which images are in similar fashion divided into blocks according to an employed block size;

dividing the block to be coded into a plurality of sub-blocks at the transmitting end;

submitting each sub-block to vector quantization with a classified codebook, a class thereof being defined on a basis of a first vector index of an original block and a quadrant label of the sub-block;

transmitting a second vector index of the sub-block with respect to the classified codebook to the receiving end;

utilizing a classified codebook which is chosen on a basis of the first vector index of the original block and the quadrant label of the sub-block at the receiving end; and looking up the codevector on a basis of the second vector index of the transmitted sub-block at the receiving end, in the chosen classified codebook that is identical with the classified codebook at the transmitting end, so that a reconstruction is obtained for the sub-block; and in which method, while designing each classified codebook, a utilized training image material is that part of an original training image set which belongs to a respective class, that is those quadrantsize sub-blocks of the training image set which receive a class index corresponding to a particular class of the codebook, when the above described steps are applied to the training image set itself.

2. A method according to claim 1, wherein the sub-blocks are further divided into smaller sub-blocks, in which each of the smaller sub-blocks is coded with a second classified codebook, where classifiers are vector indices of all those parent blocks of the smaller sub-block whereto the sub-block to be coded belongs, as well as quadrant labels of the smaller sub-blocks as well as of sub-blocks, and wherein the second classified codebooks are designed beforehand.

3. A method according to claim 1, wherein prior to each quadrant division of each sub-block, an image block is reconstructed on a basis of information so far coded, and a difference between the image block and the reconstructed image block is created, which difference block thus contains coding errors of a previous coding stage.

4. A method according to claim 1, wherein at a first block level, coding is made more effective by separating, prior to coding, a mean value of gray level tones of pixels contained in each block of the image, and by transmitting the mean value separately from the transmitting end to the receiving end.

5. A method according to claim 1, wherein the image is subjected to low pass filtering at the transmitting end, and a filtered image is separately transmitted to the receiving end, and only a high frequency component of the image.

6. A method according to claim 1, wherein a size of the codebooks used in coding the sub-blocks and possibly the subsequent smaller sub-blocks are varied case by case, on a basis of an image content, so that in coding blocks with few details, there are used smaller codebooks than in coding blocks with a lot of details, and that information of the size of the codebook is transmitted as extra information.

7. A method according to claim 1, wherein sizes of the codebooks used in coding the sub-blocks and possibly the subsequent smaller sub-blocks are varied on a basis of an image content of a coded block, so that in coding blocks with few details, there are used smaller codebooks than in coding blocks with a lot of details, in which case the size of the codebook is defined permanently on a basis of a class index.

* * * * *